J. C. SPENCER.
Odometer.
No 69,038.
Patented Sept. 17, 1867.
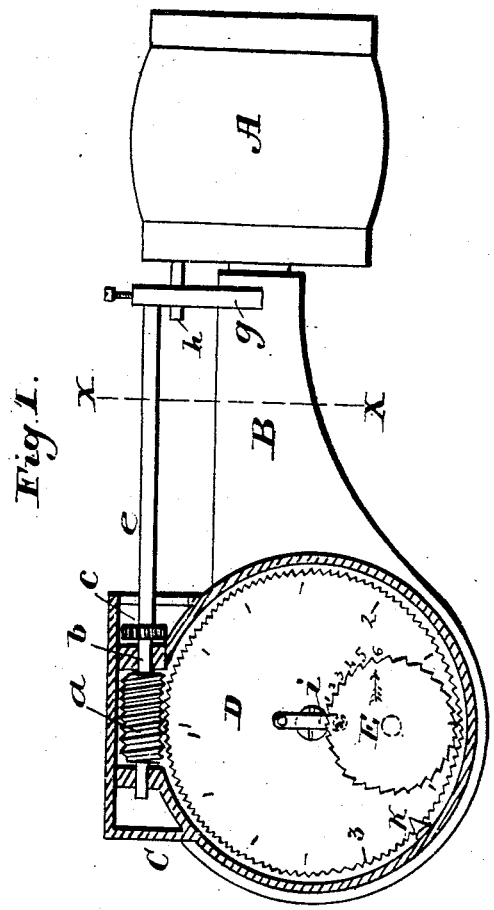
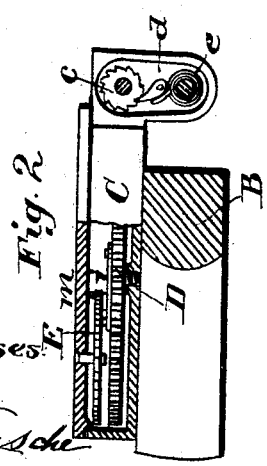
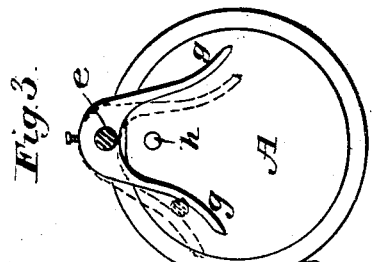

United States Patent Office.

JAMES C. SPENCER, OF PHELPS, NEW YORK, ASSIGNOR TO HIMSELF AND ARCHIBALD B. VANDEMARK, OF THE SAME PLACE.

*Letters Patent No. 69,038, dated September 17, 1867.*

IMPROVEMENT IN ODOMETER.

*The Schedule referred to in these Letters Patent and making part of the same.*

TO ALL WHOM IT MAY CONCERN:

Be it known that I, JAMES C. SPENCER, of Phelps, in the county of Ontario, and State of New York, have invented a new and improved Distance-Indicator for Vehicles; and I do hereby declare that the following is a full, clear, and exact description thereof, which will enable others skilled in the art to make and use the same, reference being had to the accompanying drawings, forming part of this specification, in which—

Figure 1 is a side view of my improved distance-indicator or odometer attached to a carriage-axle.

Figure 2 is a side view partly in section.

Figure 3 is a sectional inside end view of the hub of a wheel, showing the indicator movement.

Similar letters of reference indicate like parts.

This invention relates to an improvement in the construction of an odometer or distance-indicator for vehicles; and consists in a spur-wheel placed in a box to be attached to an axle of any vehicle, which is revolved by means of a screw or worm that receives motion by means of a pawl and ratchet with every revolution of the wheel. The spur-wheel carries an index to mark the distance travelled by the wheel, and gives motion to another smaller wheel, to indicate three times the distance or some other multiple at every revolution.

A represents the hub of a wheel on the axle B. C is a metal box fastened to the axle, in which is hung a worm-gear, $a$, on a shaft, $b$, that carries a small ratchet-wheel, $c$, which is operated by the spring-pawl $d$ attached to the rock-shaft $e$, which extends to the hub A, and has on its outer end two curved arms $g\ g$, that are alternately lifted and thrown down by contact with a pin, $h$, at every revolution of the hub A. A cog-wheel, D, placed in the box C, receives motion from the worm $a$, and is marked on its periphery with a distance-index, divided into miles and fractions of miles in such manner that when the vehicle has travelled a certain distance it shall be indicated by a pointer, $k$, fixed in the side of the box. The box C is covered with a lid, $m$, on the inside of which is hung a cog-wheel, E, which takes motion from the wheel D by means of a pin, $i$, fixed on its side near the centre, and moves one cog at every revolution of the wheel D, thus marking the number of its revolutions by a suitable index, and registering the distance by the multiple three or any number of miles travelled in one revolution of the wheel D.

Having thus described my invention, I claim as new, and desire to secure by Letters Patent—

The combination of the cog-wheels D and E in the box C, the worm-gear $a$, the ratchet-wheel $c$ operated by the spring-pawl $d$ on the rock-shaft $e$, and the hub A provided with the pin $h$ for giving motion to the rock-shaft by the arms $g\ g$, arranged and operating substantially as herein described.

The above specification of my invention signed by me this 18th day of May, 1867.

JAMES C. SPENCER.

Witnesses:
 JAMES BARBER,
 JOHN J. CRITTENDEN.